US010158696B2

(12) United States Patent
Hato et al.

(10) Patent No.: US 10,158,696 B2
(45) Date of Patent: Dec. 18, 2018

(54) IMAGE TRANSMISSION METHOD FOR TRANSMITTING IMAGE DATA BETWEEN IMAGE TRANSMISSION APPARATUS AND A PLURALITY OF TERMINAL DEVICES

(71) Applicant: CASIO COMPUTER CO., LTD., Shibuya-ku, Tokyo (JP)

(72) Inventors: Junichi Hato, Ome (JP); Tsutomu Terazaki, Saitama (JP); Shogo Hashimoto, Kawasaki (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 283 days.

(21) Appl. No.: 15/156,534

(22) Filed: May 17, 2016

(65) Prior Publication Data

US 2017/0006084 A1 Jan. 5, 2017

(30) Foreign Application Priority Data

Jul. 1, 2015 (JP) ................................. 2015-132455

(51) Int. Cl.
*G06F 17/21* (2006.01)
*H04L 29/08* (2006.01)

(52) U.S. Cl.
CPC ............ *H04L 67/06* (2013.01); *H04L 67/104* (2013.01); *H04L 67/1095* (2013.01); *H04L 67/1097* (2013.01)

(58) Field of Classification Search
CPC ... H04L 67/06; H04L 67/104; H04L 67/1095; H04L 67/1097
USPC ........................................ 709/202, 203, 204
See application file for complete search history.

(56) References Cited

U.S. PATENT DOCUMENTS

| | | | | |
|---|---|---|---|---|
| 6,542,629 B1* | 4/2003 | Wu | ..................... | H04N 1/00846 356/71 |
| 7,487,449 B2* | 2/2009 | Mizuta | ................... | G06Q 10/10 715/700 |
| 7,533,125 B2* | 5/2009 | Satomi | ..................... | G06F 21/62 |
| 8,321,920 B2* | 11/2012 | Nakajima | ............... | H04L 9/321 358/1.15 |
| 9,697,179 B2* | 7/2017 | Seo | ........................ | G06F 17/211 |
| 9,979,800 B2* | 5/2018 | Berookhim | ........ | G06K 9/00288 |
| 9,990,774 B2* | 6/2018 | Mao | ....................... | G06T 19/006 |

(Continued)

FOREIGN PATENT DOCUMENTS

| | | |
|---|---|---|
| JP | 09222847 A | 8/1997 |
| JP | 2005244605 A | 9/2005 |

*Primary Examiner* — Thu Ha T Nguyen
(74) *Attorney, Agent, or Firm* — Holtz, Holtz & Volek PC

(57) ABSTRACT

An object is to appropriately control the transmission of image data to a plurality of terminal devices such that the user's desired playback is performed when plural pieces of image data are replayed using the plurality of terminal devices on the user side. When predetermined identification information is received from a first terminal device, a management server apparatus transmits first image data to the first terminal device. Then, when predetermined identification information is received from a second terminal device different from the first terminal device, the management server apparatus transmits second image data related to the first image data to the second terminal device if the received predetermined identification information is the same as the identification information received from the first terminal device.

18 Claims, 10 Drawing Sheets

(56) References Cited

U.S. PATENT DOCUMENTS

| | | | |
|---|---|---|---|
| 2007/0046985 A1* | 3/2007 | Komada | G06F 3/1204 358/1.15 |
| 2012/0030131 A1* | 2/2012 | Gibbons | G06Q 50/2053 705/327 |
| 2012/0045745 A1* | 2/2012 | Lee | G09B 5/06 434/351 |
| 2012/0110646 A1* | 5/2012 | Ajitomi | G06F 21/335 726/4 |
| 2013/0285909 A1* | 10/2013 | Patel | G09B 5/00 345/158 |
| 2015/0373414 A1* | 12/2015 | Kinoshita | H04N 5/23216 386/282 |
| 2016/0364191 A1* | 12/2016 | Akuta | G06F 3/1238 |
| 2017/0116466 A1* | 4/2017 | Resnick | G06K 9/00288 |

* cited by examiner

FIG. 4A

UB USER DATABASE

| USER NAME | USER IDENTIFICATION INFORMATION | | MAIL ADDRESS, AND THE LIKE |
|---|---|---|---|
| | USER ID | PASSWORD | |
| AAAA | 1010 | ○○○○ | ... |
| BBBB | 1011 | △△△△ | ... |
| ⋮ | ⋮ | ⋮ | ⋮ |

FIG. 4B

IB IMAGE DATABASE

| IMAGE ID | USER ID | FIRST ATTRIBUTE INFORMATION (IMAGE CAPTURING CONDITION) | | SECOND ATTRIBUTE INFORMATION (IMAGE CAPTURING CONDITION) |
|---|---|---|---|---|
| | | IMAGE CAPTURING DATE AND TIME | IMAGE CAPTURING POSITION | IMAGE CAPTURING DIRECTION (ANGLE) |
| 0001 | 1010 | 2015/6/20 13:00:00 ~13:20:00 | LATITUDE/ LONGITUDE ○○ | ANGLE ○○ |
| 0002 | 1010 | 2015/6/20 12:55:00 ~13:05:00 | LATITUDE/ LONGITUDE ○○ | ANGLE △△ |
| ⋮ | ⋮ | ⋮ | ⋮ | ⋮ |
| 0100 | 1010 | 2015/6/20 13:10:00 ~13:21:00 | LATITUDE/ LONGITUDE ○○ | ANGLE ○△ |
| ⋮ | ⋮ | ⋮ | ⋮ | ⋮ |

FIG. 4C

IF IMAGE FILE GROUP

IMAGE ID:0001  ... IMAGE ID:0100  ...

FIG. 10

| IMAGE ID | USER ID | FIRST ATTRIBUTE INFORMATION | | SECOND ATTRIBUTE INFORMATION |
|---|---|---|---|---|
| | | TYPE OF PHOTOGRAPHIC SUBJECT (PERSON) | IMAGE CAPTURING LOCATION | IMAGE CAPTURING DATE AND TIME |
| 0001 | 1010 | OLDEST DAUGHTER | ○○ PARK SQUARE | 2010/6/10··· |
| 0002 | 1010 | OLDEST DAUGHTER | ○○ PARK SQUARE | 1999/7/15··· |
| ⋮ | ⋮ | ⋮ | ⋮ | ⋮ |

IB IMAGE DATABASE

IMAGE TRANSMISSION METHOD FOR TRANSMITTING IMAGE DATA BETWEEN IMAGE TRANSMISSION APPARATUS AND A PLURALITY OF TERMINAL DEVICES

CROSS-REFERENCE TO RELATED APPLICATION

This application is based upon and claims the benefit of priority from the prior Japanese Patent Application No. 2015-132455, filed Jul. 1, 2015, the entire contents of which are incorporated herein by reference.

BACKGROUND OF THE INVENTION

1. Field of the Invention

The present invention relates to an image transmission system for transmitting image data between an image transmission apparatus and a plurality of terminal devices, an image transmission apparatus, and an image transmission method.

2. Description of the Related Art

It has become common that plural types of information terminal devices such as a personal computer (PC), a digital camera, a tablet terminal, and a smartphone are owned by one user or owned at home. In an environment connectable to a network such as a LAN (Local Area Network), a WAN (Wide Area Network), or a public telephone network, when one of the information terminal devices is selected and connected to a server apparatus, various types of services can be used. For example, a technique is known in which, in such a network environment, plural pieces of moving image data (teaching materials) are simultaneously transmitted from among various types of moving image data stored and managed on a server apparatus (image transmission apparatus) side to information terminal devices (client terminals) on student sides, and the moving image data are synchronously replayed on a display on each information terminal device side (refer to, for example, Japanese Patent Application Laid-Open (Kokai) Publication No. 09-222847).

SUMMARY OF THE INVENTION

In accordance with one aspect of the present invention, there is provided an image transmission apparatus for controlling transmission of image data to a plurality of terminal devices, comprising: a communication section including a communication circuit; and a control section including a processor and a memory, wherein the control section (i) transmits first image data to a first terminal device by the communication section when predetermined identification information is received from the first terminal device via the communication section, (ii) judges, when predetermined identification information is received from a second terminal device different from the first terminal device via the communication section, whether or not the predetermined identification information received from the second terminal device is the same as the predetermined identification information received from the first terminal device, and (iii) transmits second image data related to the first image data to the second terminal device by the communication section when a judgment is made that the predetermined identification information received from the second terminal device is the same as the predetermined identification information received from the first terminal device.

In accordance with another aspect of the present invention, there is provided an image transmission method for transmitting image data between an image transmission apparatus and a plurality of terminal devices, wherein the image transmission apparatus (i) transmits first image data to a first terminal device when predetermined identification information is received from the first terminal device, (ii) judges, when predetermined identification information is received from a second terminal device different from the first terminal device, whether or not the predetermined identification information received from the second terminal device is the same as the predetermined identification information received from the first terminal device, and (iii) transmits second image data related to the first image data to the second terminal device when a judgment is made that the predetermined identification information received from the second terminal device is the same as the predetermined identification information received from the first terminal device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4A shows a user database UB, FIG. 4B shows an image database IB, and FIG. 4C shows an image file group IF;

FIG. 10 shows contents of an image database IB for showing another modification example of the present embodiment.

DETAILED DESCRIPTION OF THE PREFERRED EMBODIMENTS

An embodiment of the present invention will hereinafter be described with reference to FIG. 1 to FIG. 8.

Figure 1:
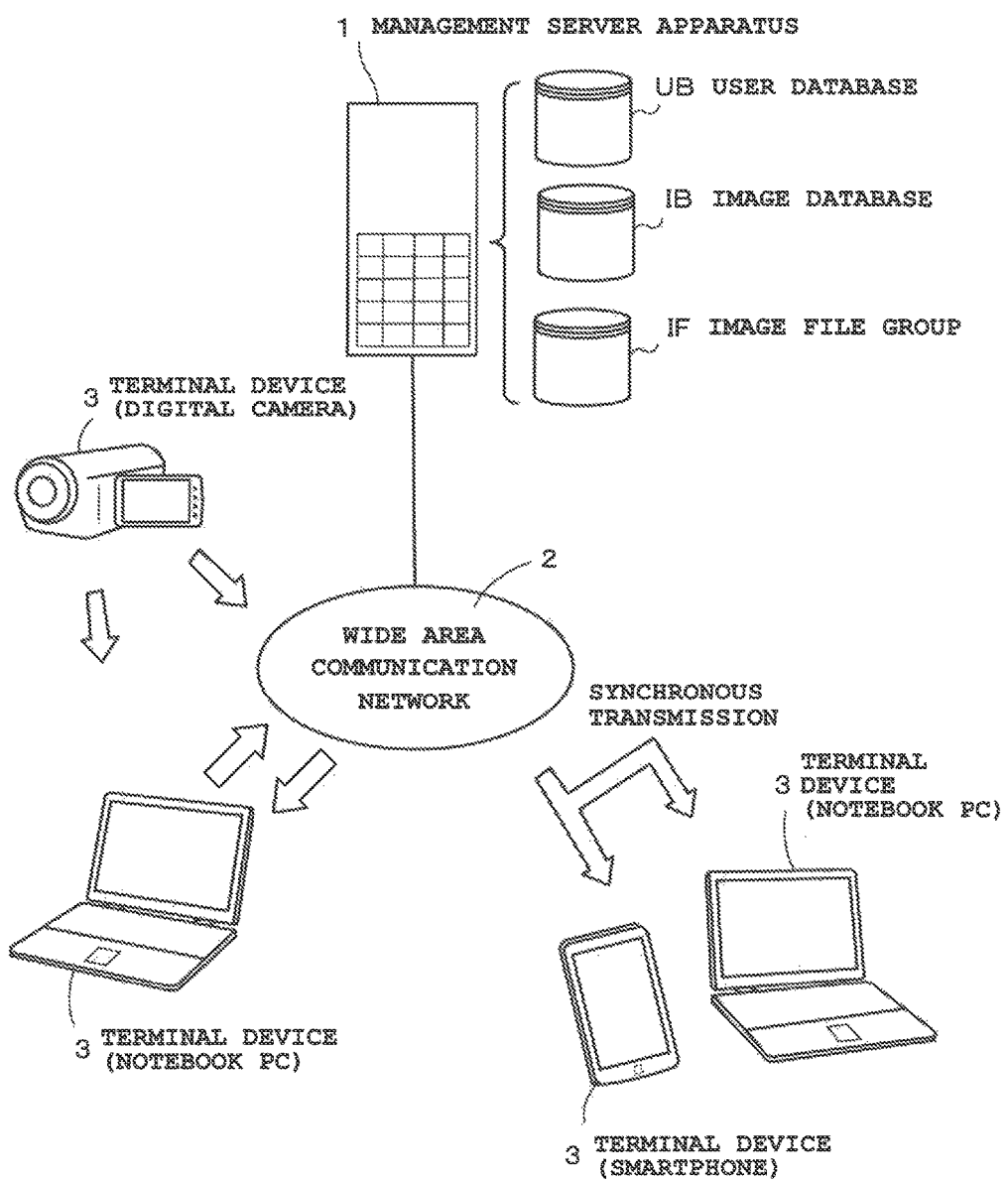
FIG. 1 is a block diagram showing a communication network system (image transmission system) having a management server apparatus (image transmission apparatus) 1 as its core.

FIG. 1 is a block diagram showing a communication network system (image transmission system) having a management server apparatus (image transmission apparatus) 1 as its core.

In this image transmission system, various types of terminal devices (client terminals) 3 on the user side are connectable to the management server apparatus 1 that controls the entire system, via a wide area communication network (such as a communication network including a wireless LAN (Local Area Network), a mobile communication network, and the Internet) 2. Note that, although an example of the image transmission system herein is a cloud computing system that provides a service for member users (an image transmission service) via the Internet, the present invention is not limited thereto. For example, the image transmission system may be a server client system such as an in-plant communication system constructed in an office or a home.

The management server apparatus 1, which is installed on the side of a business operator who provides an image transmission service, includes a user database UB for user authentication, an image database IB for moving image management, and an image file group IF for moving image recording. The management server apparatus 1 searches, when requested to record and store moving image data from a terminal device 3 on the user side, the user database UB to receive the requested moving image data, and records and stores the received moving image data in the image file group IF on condition that the request source is a valid user. Also, when requested to transmit moving image data from the terminal device 3 on the user side, the management server apparatus 1 refers to the image database IB on condition that the request source is a valid user, reads out the requested moving image data from the image file group IF, and streams the read moving image data for playback by the terminal device 3 of the request source.

The terminal device 3 on the user side includes a notebook PC (Personal Computer), a digital camera, a smartphone, and a tablet terminal each owned by one user or at home, and has not only a communication function connectable to the management server apparatus 1 via the wide area communication network 2 but also a playback function for replaying moving image data. Note that, although the depicted example shows a case where moving image data captured by the terminal device (digital video camera) 3 is transmitted to the management server apparatus 1 directly or via the terminal device (notebook PC) 3 and recorded and stored therein, the present invention is not limited thereto. For example, moving image data captured by the camera-equipped terminal device (smartphone) 3 may be transmitted to the management server apparatus 1 directly or via the terminal device (notebook PC) 3 and recorded and stored therein.

The management server apparatus 1 transmits first image data to a first terminal device 3 when predetermined identification information is received from the first terminal device 3. Also, the management server apparatus 1 transmits, upon receiving predetermined identification information from a second terminal device 3 different from the first terminal device 3, second image data related to the first image data to the second terminal device 3 if the received predetermined identification information is the same as the identification information received from the first terminal device 3.

The shown example indicates a case where plural pieces of moving image data are separately transmitted to a plurality of terminal devices 3, that is, a terminal device 3 that is a smartphone and a terminal device 3 that is a notebook PC. Here, when the terminal device (notebook PC) 3 is a terminal device 3 (first terminal device 3) that has been first logged in to, and the other terminal device (smartphone) 3 is a terminal device 3 (second terminal device 3) different from the first terminal device 3, requested first image data (a main image) is streamed to the first terminal device (notebook PC) 3 that has been first logged in to, and image data (second image data) related to the main image is streamed to the second terminal device (smartphone) 3. Here, when transmitting the first image data (main image) and the second image data related thereto, the management server apparatus 1 transmits these image data with their transmission timings being synchronized with each other such that their image capturing times coincide with each other.

Figure 2:
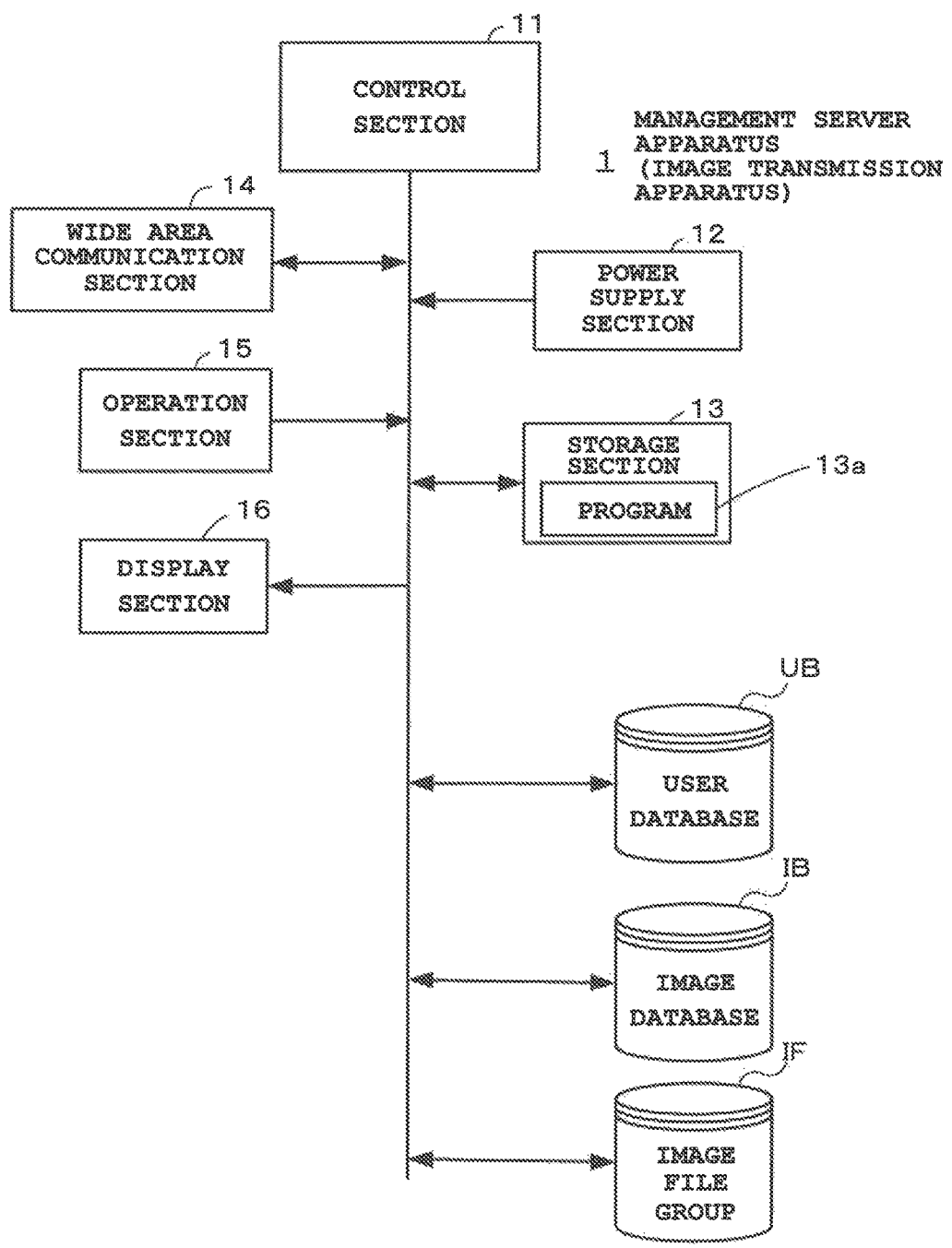
FIG. 2 is a block diagram showing basic components of the management server apparatus (image transmission apparatus) 1.

FIG. 2 is a block diagram showing basic components of the management server apparatus (image transmission apparatus) 1.

A control section 11 in FIG. 2, which is operated by power supply from a power supply section 12, includes a processor such as a CPU (Central Processing Unit) which controls the entire operation of the management server apparatus 1 according to various types of programs in a storage section 13 and a memory. The storage section 13 includes a ROM (Read Only Memory) and a flash memory and, for example, has a program memory 13a storing a program and various types of applications for actualizing the present embodiment according to an operation procedure shown in FIG. 5 to FIG. 7. The storage section 13 may be structured to include a removable portable memory (recording medium) such as an SD (Secure Digital) card or an IC (Integrated Circuit) card, or may be structured to include, although not shown, a storage area on another server apparatus side in a case where the management server apparatus 1 is connected to a network by a communication function.

The control section 11, to which a wide area communication section 14 including a communication circuit for communication connection to the Internet, an operation section 15 including various types of keys, and a display section 16 such as a high-definition liquid crystal display are connected as its input/output devices, controls their input/output operations. The user database, the image database IB, and the image file group IF are connected to the control section 11. The control section 11 accesses the user database UB during user authentication or accesses the image database IB and the image file group IF during the storage of moving image data and during the transmission of moving image data.

Figure 3:
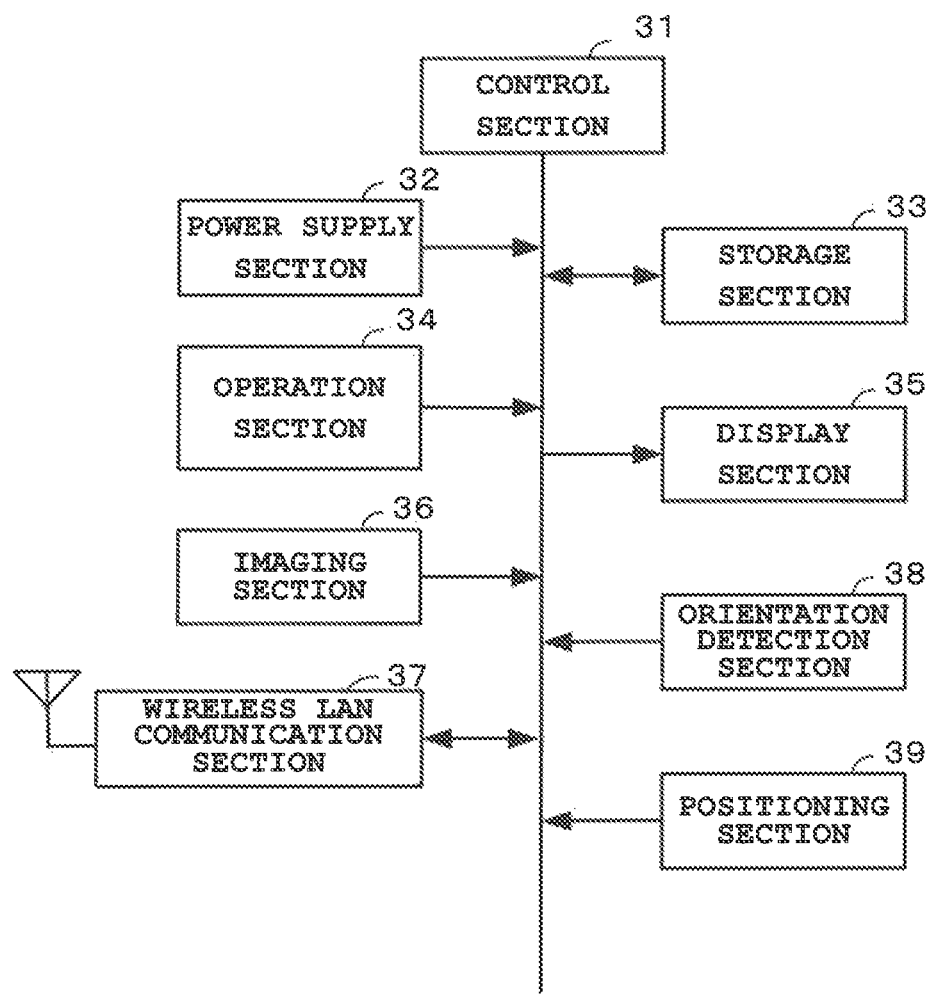
FIG. 3 is a block diagram showing basic components of a terminal device (digital video camera) 3.

FIG. 3 is a block diagram showing basic components in the terminal device (digital video camera) 3.

The shown terminal device 3 is a digital video camera capable of high-definition image capturing. A control section 31 in the terminal device 3, which includes a processor (CPU), operates by power supply from a power supply section 32 and controls the entire operation of the digital video camera 3 according to various types of programs in a storage section 33 including a ROM, a flash memory, and the like. The control section 31, to which an operation section 34 including various types of keys, a display section 35 such as a liquid crystal display, an imaging section 36, a wireless LAN (Local Area Network) communication section 37, an orientation detection section 38, and a positioning section 39 are connected as its input/output devices, controls their respective input/output operations.

The imaging section 36 includes an image sensor and an image capturing control circuit, and captures a moving image of an object with high definition. This captured moving image is recorded and stored in an SD card in the storage section 33 together with attribute information such as an image capturing date and time and an image capturing location. The wireless LAN communication section 37, which includes a communication circuit for wireless communication and performs WI-FI (Wireless Fidelity) communication between another device such as a router and itself, transmits and receives moving image data to and from the management server apparatus 1 via the wide area communication network 2. The orientation detection section 38 includes one or a combination of a plurality of sensors such as an acceleration sensor, a gyro censor, and an orientation sensor as a sensor that detects the orientation of the camera, and detects an orientation, an elevation angle, and a depression angle in an image capturing direction (optical axis direction). This image capturing direction detected by the orientation detection section 38 is associated with captured moving image data and recorded and stored therein as attribute information regarding the moving image data. The positioning section 39 includes a GPS (Global Positioning System) circuit that measures a position of the camera using a GPS. Positional information (latitude/longitude information) detected by the positioning section 39 is associated with captured moving image data and is recorded and stored therein as attribute information regarding the moving image data.

FIG. 4A shows the user database UB.

The user database UB is a database for user authentication, and has fields of "user name", "user identification information", "mail address" and the like. The "user identification information" is information for identifying a user individual, and has fields of "user ID (Identifier)" and "password". Note that the contents of these fields are not required to be in a one-to-one correspondence with each user, and a plurality of user IDs and passwords may be storable for each of the users. That is, not only the user himself/herself but also a family particularly permitted may be accessible to the management server apparatus 1. Also, although the case where the present invention has been applied to the user identification information has been shown in the present embodiment, the present invention is not limited thereto. The user identification information may be user group identification information for identifying a plurality of users as a group or terminal group identification information for identifying the plurality of terminal devices 3 as a group.

FIG. 4B shows the image database IB.

The image database IB is a database for storing moving image data, and has fields of "image ID", "user ID", "first attribute information", and "second attribute information". The "image ID" is image identification information (e.g., a series of numbers). Every time moving image data serving as a recording target is received from the terminal device 3, the control section 11 generates an "image ID", generates an image file acquired by compressing the moving image data received from the terminal device 3, and records and stores the generated image file in the image file group IF after adding the "image ID" thereto.

The "first attribute information" and the "second attribute information" respectively indicate attributes of moving image data. The "first attribute information" is classified into fields of "image capturing date and time" and "image capturing location" respectively representing image capturing conditions, and the "second attribute information" indicates a field of "image capturing direction (angle)" representing an image capturing condition. The "image capturing date and time" is data representing a year, a month, a day, an hour, a minute, and a second, and the "image capturing location" is information regarding a latitude and a longitude calculated by a GPS. The "image capturing direction (angle)" is angle information representing an orientation, an elevation angle, and a depression angle of a camera optical axis as an image capturing direction.

Next, the operation concept of the management server apparatus (image transmission apparatus) 1 in the present embodiment will be described with reference to flowcharts shown in FIG. 5 to FIG. 7. Here, each function described in these flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium.

Figure 5:
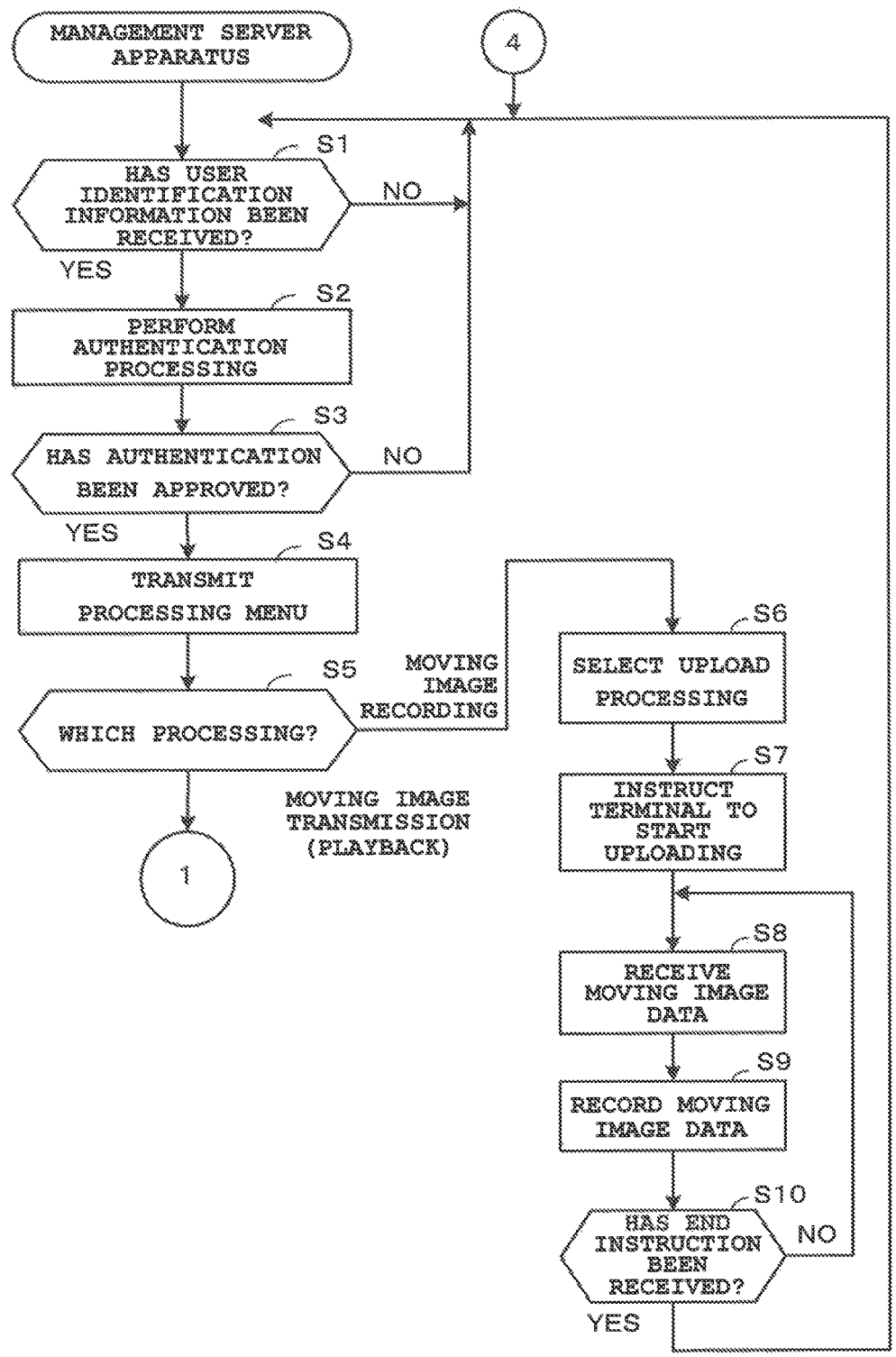
FIG. 5 is a flowchart outlining the operations of a feature portion of the present embodiment in an overall operation of the management server apparatus (image transmission apparatus) 1.
Figure 6:
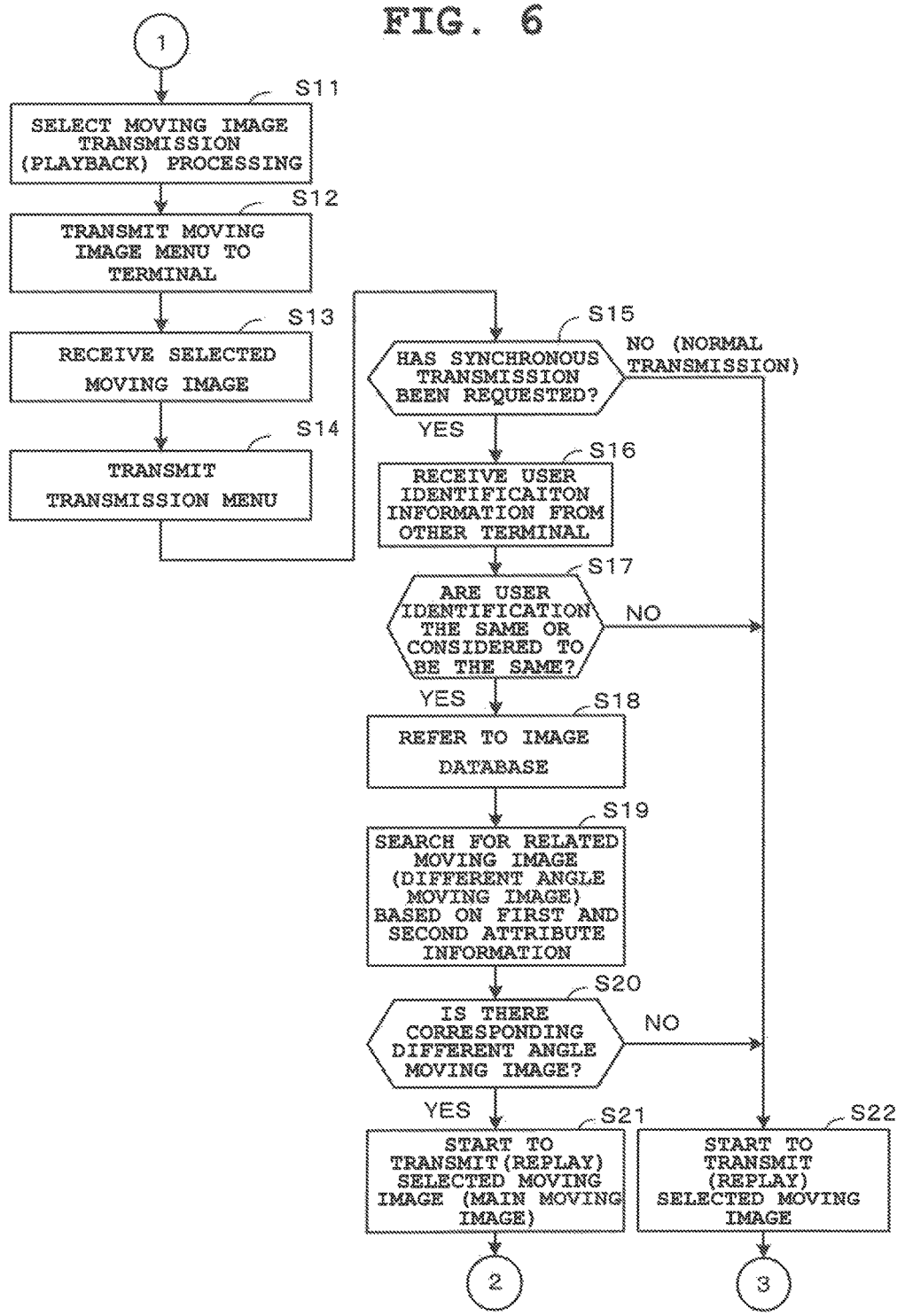
FIG. 6 is a flowchart showing operations following those in FIG. 5.
Figure 7:
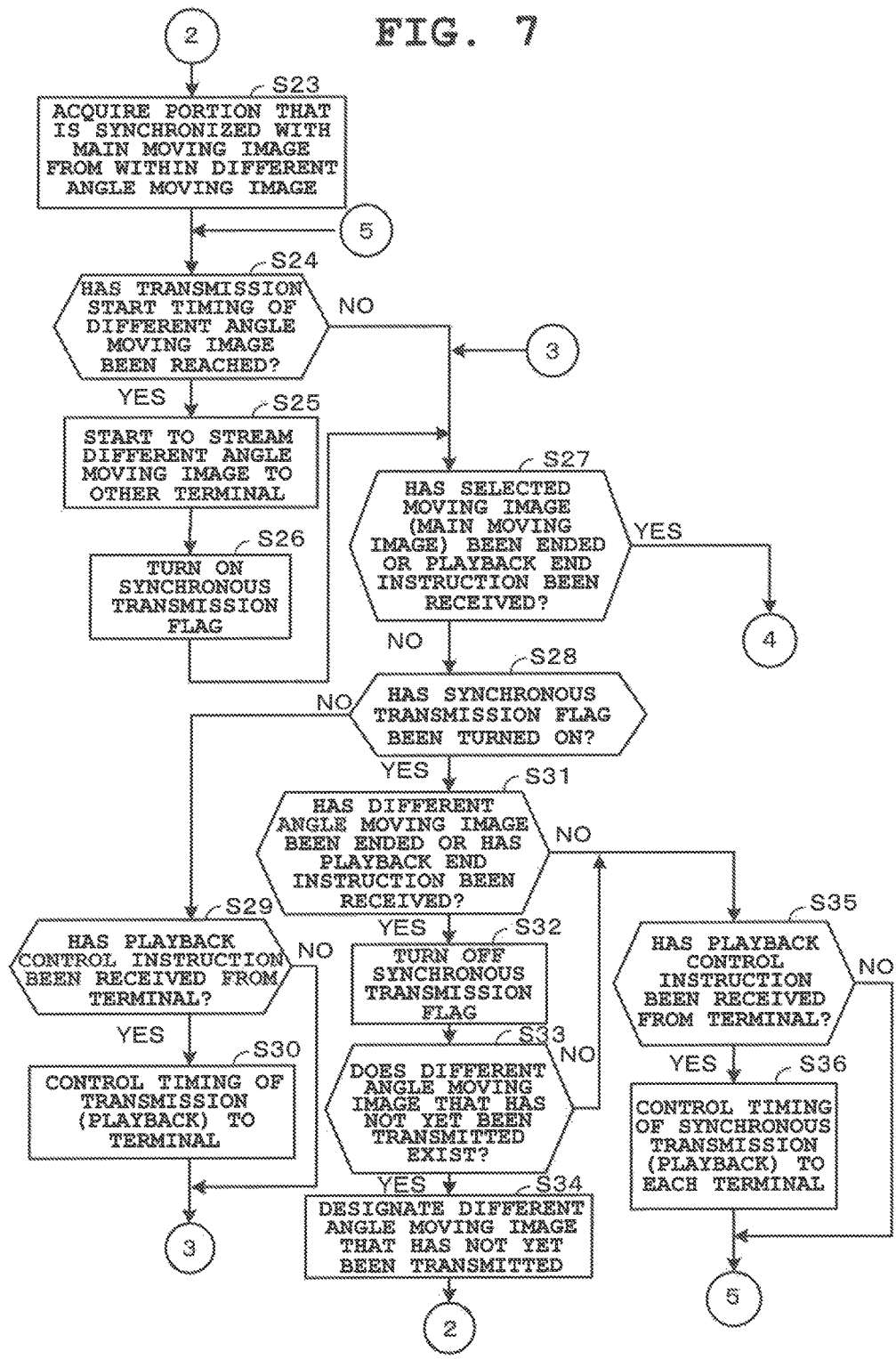
FIG. 7 is a flowchart showing operations following those in FIG. 5 and FIG. 6.
Figure 8:
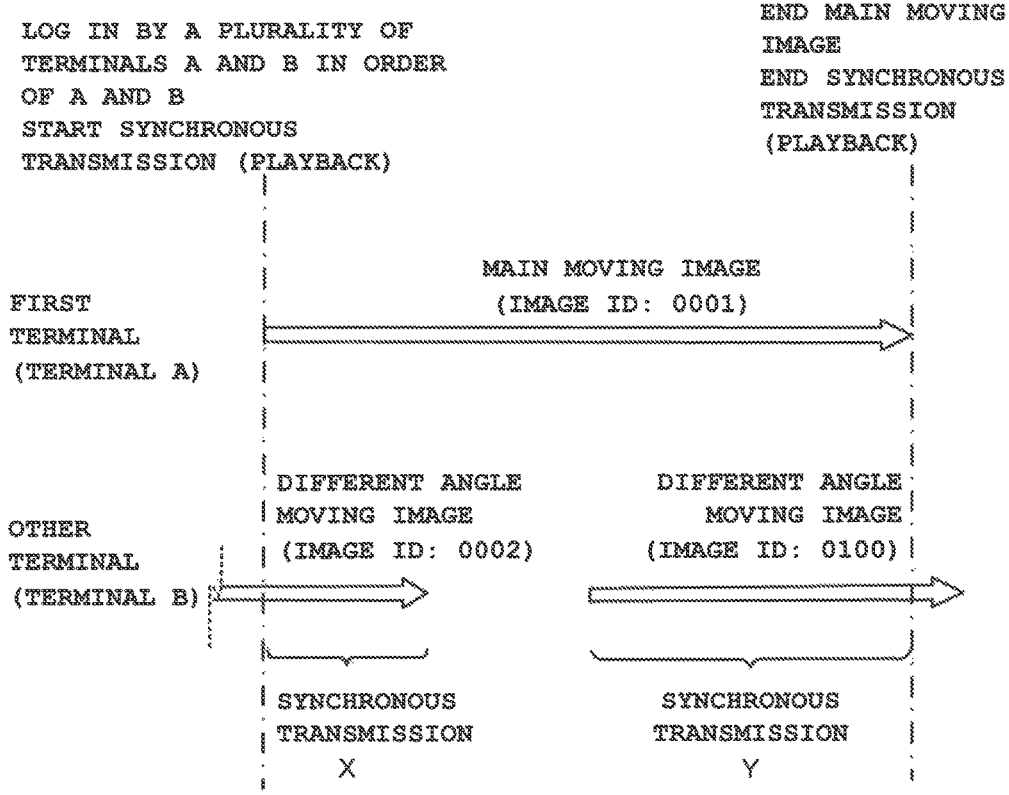
FIG. 8 is a timing chart for showing moving image transmission (playback) processing performed when a plurality of terminal devices (terminal A and terminal B) are logged in to in the order of terminal A and terminal B.

FIG. 5 to FIG. 7 are flowcharts outlining the operations of a feature portion of the present embodiment in an overall operation of the management server apparatus (image transmission apparatus) 1. Hereinafter, characteristic operations in the present embodiment will be described with reference to a specific example of FIG. 8. FIG. 8 is a timing chart for showing moving image transmission (playback) processing that is started when a plurality of terminal devices (terminal A and terminal B) are logged in to in the order of terminal A and terminal B.

First, the control section 11 is in a state (a login standby state) of waiting for inputting of user identification information by one of the terminal devices 3 (Step S1 shown in FIG. 5). Then, when judged that user identification information (a user ID and a password) has been inputted from one of the terminal devices 3 (YES at Step S1), the control section 11 executes authentication processing by referring to the user database UB (Step S2), and judges whether or not a valid user has logged in based on whether or not the corresponding user information has been stored in the user database UB.

When judged that the inputted user identification information has not been stored in the user database UB, i.e., when judged a valid user has not logged in (NO at Step S1), the control section 11 returns to Step S1 to invalidate the login. Conversely, when judged that the inputted user identification information has been stored in the user database UB, i.e., when judged that authentication has been approved (a valid user has logged in) (YES at Step S3), the control section 11 transmits a processing menu for permitting the terminal device 3 to log in (Step S4). This processing menu has a menu item for selecting "moving image recording processing" and a menu item for selecting "moving image transmission (playback) processing". When the control section 11 receives a menu item optionally selected on the terminal device 3 side, the control section 11 judges whether "moving image recording processing" has been requested or "moving image transmission (playback) processing" has been requested as the type of the selected menu item (Step S5).

When the menu item for "moving image recording processing" has been selected on the terminal device 3 side, and is received therefrom, the control section 11 selects upload processing (moving image recording processing) (Step S6), and instructs the terminal device 3 to start to upload moving image data (Step S7). When the moving image data transmitted from the terminal device 3 in response to the start instruction and serving as a recording target is received (Step S8), the control section 11 performs processing for recording and storing the received moving image data in the image file group IF (Step S9).

That is, when moving image data is received from the terminal device 3, the control section 11 generates an image ID (a series of numbers), generates an image file having the image ID added thereto, and records and stores the generated image file in the image file group IF. In addition, the control section 11 acquires various types of attribute information added to the received moving image data, generates a record having each of the fields "image ID", "user ID", "first attribute information (image capturing date and time and image capturing location)", and "second attribute information (image capturing direction (angle)", and stores the generated record as management information in the image database IB. Then, the control section 11 proceeds to Step S10. At Step S10, the control section 11 judges whether a signal for giving an instruction to end the moving image recording has been received from the terminal device 3. When judged that an instruction to end the recording has not been given (NO at Step S10), the control section 11 returns to Step S8. At Step S8, the control section 11 repeats processing for receiving subsequent moving image data and recording and storing the received subsequent moving image data. Conversely, When judged that an instruction to end the recording has been given (YES at Step S10), the control section 11 returns to the first Step S1 and enters a login standby state. Hereafter, every time moving image recording is requested from the terminal device 3, the control section 11 repeats the above-described operations.

At Step S5, when the menu item for "moving image transmission (playback) processing" has been selected on the terminal device 3 side, and is received therefrom (Step S5), the control section 11 selects moving image transmission (playback) processing (Step S11 shown in FIG. 6), and transmits a moving image menu to the terminal device 3 (Step S12). This moving image menu indicates a list of moving images recorded in the past. Then, when a moving image optionally selected as a playback target on the terminal device 3 side from within the list of moving images is received (Step S13), the control section 11 transmits a transmission menu to the terminal device 3 (Step S14). This transmission menu has a menu item for selecting "normal transmission" and a menu item for selecting "synchronous transmission". Then, when a menu item optionally selected on the terminal device 3 side is received, the control section 11 judges whether or not "synchronous transmission" has been requested as the type of the selected menu item (Step S15).

The "synchronous transmission" indicates processing for synchronously transmitting plural pieces of moving image data related to one another to the plurality of terminal devices 3 separately by the management server apparatus (image transmission apparatus) 1, as described above. On the other hand, the "normal transmission" indicates transmission processing other than the "synchronous transmission", e.g., processing for individually transmitting moving image data requested by the terminal device 3 serving as a request source of moving image data. When the menu item for "normal transmission" has been selected on the terminal device 3 side, and is received (NO at Step S15), the control section 11 starts an operation for reading out the data of the moving image selected as a playback target on the terminal device 3 side (the selected moving image) from the image file group IF and streaming the read moving image data to the terminal device 3 serving as a request source (Step S22). When the reception of the moving image data from the management server apparatus 1 is started, the terminal device 3 starts an operation for replaying the moving image data on its own display screen (the same applies hereafter).

Then, the control section 11 proceeds to Step S27 shown in FIG. 7. At Step S27, the control section 11 judges whether the selected moving image has been transmitted up to the end (the data has ended) or a signal for giving an instruction to end the playback operation (an end instruction) has been received from the terminal device 3 that is performing the playback operation. When judged that the data has not ended or an end instruction has not been received (NO at Step S27), the control section 11 judges whether a synchronous transmission flag (not shown) has been turned on (Step S28). This synchronous transmission flag is a flag indicating a state where a main moving image and a different angle moving image are being synchronously transmitted to the plurality of terminal devices 3. In the case where the "normal transmission" has been selected, the synchronous transmission flag has been turned off (NO at Step S28). Therefore, the control section 11 judges whether a playback control instruction for designating one of fast-forward, rewind, and temporary stop has been received from the terminal device 3 that is performing the playback operation (Step S29).

When judges that a playback control instruction has not been received (NO at Step S29), the control section 11 returns to Step S27. Conversely, when judges that a playback control instruction has been received (YES at Step S29), the control section 11 performs processing for controlling the transmission timing (playback timing) of the moving image data that is being transmitted (replayed) such that the playback state is switched to the designated state of fast-forward, rewind, or temporary stop (Step S30), and then proceeds to the above-described Step S27. When the moving image data is ended while the moving image is being transmitted as described above, or when an end instruction is received (YES at Step S27), the control section 11 returns to Step S1 shown in FIG. 5, and enters a login standby state.

At Step S15, when the menu item for "synchronous transmission" has been selected (YES at Step S15 shown in FIG. 6), the control section 11 receives user identification information from the other terminal device 3 different from the terminal device 3 that has logged in first (Step S16). For example, when user identification information is received from the other terminal device (terminal B) 3 after the terminal device (terminal A) has logged in first, i.e., when the plurality of terminal devices 3 has sequentially logged in, as shown in FIG. 8, the control section 11 judges whether or not user identification information from the plurality of terminal devices 3 are information (valid user identification information previously permitted) that are the same or are different from one another but considered to be the same (Step S17). When judged that the user identification information are not the same or are not considered to be the same (NO at Step S17), the control section 11 executes the above-described normal moving image transmission (playback) processing (Step S22), and proceeds to Step S27 shown in FIG. 7. Note that the control section 11 may perform authentication processing for searching the user database UB based on the user identification information received from the other terminal device (terminal B) 3, and then judge whether the user identification information are the same or are considered to be the same.

When judged that the user identification information from the plurality of terminal devices 3 are the same or are considered to be the same (YES at Step S17), the control section 11 refers to the image database IB (Step S18). Subsequently, based on the "image ID" of image data (main image) requested from the terminal device (terminal A) 3 that has logged in first, the control section 11 reads out "first attribute information" and "second attribute information"

associated with the "image ID", and searches for image data that are the same in the "first attribute information" and are different in the "second attribute information", as image data related to the main image (Step S19). That is, the control section 11 searches for image data that are the same in the image capturing conditions "image capturing date and time" and "image capturing location" serving as the "first attribute information" and are different in the image capturing condition "image capturing direction" serving as the "second attribute information", as image data (different angle moving images) related to the main image.

In an example of the image database IB shown in FIG. 4B, when image data with an "image ID" of "0001" is a main moving image, respective image data with "image IDs" of "0002" and "0100" are searched for as image data (a different angle moving image) related to the main moving image. That is, the "image capturing date and time" of the image data with the "image ID" of "0001" serving as the main moving image is "13:00:00 to 13:20:00, Jun. 20, 2015", and has respective "image capturing dates and times" of the image data with the "image IDs" of "0002" and "0100" in its range. Therefore, the "image capturing dates and times" of the image data are judged to be the same.

Also, "latitude/longitude ○○" as the "image capturing location" is common among the image data with the "image IDs" of "0001", "0002", and "0100". Note that "common" herein does not indicate strict matching, and their "latitudes/longitudes ○○" are judged to be common if errors among them are within a predetermined allowable range (e.g., within a radius of 10 meters). Accordingly, in the shown example, the image data with the "image IDs" of "0001", "0002, and "0101" are the same in the "first attribute information". On the other hand, the "image capturing directions" of the image data with the "image IDs" of "0001", "0002", and "0100", which are "angle ○○", "angle △△", and "angle ○△", are different. Therefore, the image data are different in the "second attribute information". Note that "different" herein does not indicate strict mismatching, and their "image capturing directions" are judged to be different if differences among them are within a predetermined allowable range (e.g., ±5°) or more. Accordingly, with respect to the main moving image with the "image ID" of "0001", the respective image data with the "image IDs" of "0002" and "0100" are searched for as the image data related to the main moving image (different angle moving image).

As a result, the control section 11 judges whether the image data (different angle moving image) related to the main moving image can be searched for (Step S20). If the corresponding different angle moving image does not exist (No in Step S20), the control section 11 executes the above-described normal moving image transmission (playback) processing (Step S22), and then proceeds to Step S27 shown in FIG. 7. Conversely, if the corresponding different angle moving image exists (YES at Step S20), the control section 11 starts an operation for transmitting (reproducing) the selected moving image (main moving image) to the terminal device (terminal A) 3 that has logged in first (Step S21). Then, the processing proceeds to Step S23 shown in FIG. 7. At Step S23, the control section 11 acquires a portion that is synchronized with the main moving image from within the different angle moving image as a transmission target (playback target).

That is, a portion having the "image capturing date and time" of the different angle moving image is acquired as a moving image portion that is synchronized with the main moving image, in the range of the image capturing date and time" of the main moving image. For example, in the case of FIG. 4B, the "image capturing date and time" of the main moving image with the image ID "0001" is "13:00:00 to 13:20:00, Jun. 20, 2015" and the "image capturing date and time" of the main moving image with the image ID "0002" is "12:55:00 to 13:05:00, Jun. 20, 2015". Therefore, a moving image portion (see "X" in FIG. 8) within a range indicated by "13:00:00 to 13:05:00" is acquired as a moving image portion (a portion of the different angle moving image that is synchronized with the main moving image) where the "image capturing dates and times" coincide with each other.

To synchronize the transmission of the main moving image and the transmission of the different angle moving image, the control section 11 judges whether the transmission start timing of the different angle moving image has been reached (Step S24). For example, when the moving image portion in the range indicated by "13:00:00 to 13:05:00" has been acquired as a moving image portion that is synchronized with the main moving image, from within the different angle moving image, "13:00:00" is the transmission start timing of the different angle moving image. Here, "13:00:00" coincides with the transmission start timing of the main moving image, and therefore the time when the transmission of the main moving image is started is the transmission start timing of the different angle moving image. In this case, the control section 11 starts an operation for streaming the different angle moving image to the terminal device (terminal B) 3 (Step S25) at the start of an operation for streaming the main moving image to the terminal device (terminal A) 3, as shown in FIG. 8. Hereafter, the main moving image and the different angle moving image are synchronously transmitted at the same timing with their respective image capturing times coinciding with each other.

When the synchronous transmission is started as described above, the control section 11 turns on a synchronous transmission flag (Step S26), and proceeds to Step S27. At Step S27, the control section 11 starts to transmit the data of the selected moving image (main moving image), and then judges whether the selected moving image (main moving image) has been transmitted up to the end (the data has ended) or an instruction to end the playback of the main moving image has been received from the terminal device 3 that is performing the playback operation. When judged that the data has not ended or a playback end instruction has not been received (NO at Step S27), the control section 11 judges whether the above-described synchronous transmission flag has been turned on (Step S28). In the case where the main moving image and the different angle moving image are being synchronously transmitted, the synchronous transmission flag has been turned on (YES at Step S28), and therefore the control section 11 proceeds to Step S31. At Step S31, the control section 11 judges whether the different angle moving image has been transmitted up to the end (the data of the different angle moving image has ended) or an instruction to end the playback of the different angle moving image has been received from the terminal device 3 that is transmitting (replaying) the different angle moving image.

When judged that the data of the different angle moving image has not ended, or an instruction to end the playback has not been received (NO at Step S31), the control section 11 judges whether a playback control instruction for designating one of fast-forward, rewind, and temporary stop has been received, as in the case of Step S29 (Step S35). When judged that a playback control instruction has not been received (NO at Step S35), the control section 11 returns to the above-described Step S24. Conversely, when judged that a playback control instruction has been received (YES at Step S35), the control section 11 performs processing for controlling the transmission timing of the moving image data that is being synchronously transmitted (synchronously replayed) such that the playback state is switched to the designated state of fast-forward, rewind, or temporary stop (Step S36). In this case, the respective transmission timings for the plurality of terminal devices (e.g., terminal A and terminal B) 3 are controlled such that the playback states of the plurality of terminal devices 3 are the same. Then, the processing returns to the above-described Step S24.

As shown in FIG. 8, when the different angle moving image (the image data with the image ID "0002") that is being transmitted (replayed) is transmitted to its end (YES at Step S31), the control section 11 turns off the above-described synchronous transmission flag (Step S32). In a case where the number of the terminal devices 3, which are performing synchronous transmission, is three or more, even when the data transmission of one of the terminal devices 3 is ended, the above-described synchronous transmission flag remains turned on if the synchronous transmission by the other terminal devices 3 is being continued. Then, the control section 11 proceeds to Step S33. At Step S33, the control section 11 judges whether another different angle moving image which has not yet been transmitted (replayed) exists, or in other words, judges whether there remains a different angle moving image that has not yet been transmitted (replayed) among the plurality of different angle moving images searched for as the image data (different angle moving image) related to the main moving image in the above-described Step S19 shown in FIG. 6.

When judged that all of the different angle moving images have been transmitted (NO at Step S33), the control section 11 proceeds to the above-described Step S35. However, when the data of the different angle moving image (the image data with the image ID "0002") has ended but there still remains another different angle moving image (the image data with the image ID "0100") (YES at Step S33) as shown in FIG. 8, the control section 11 designates the remaining different angle moving image as a new transmission target (Step S34), and proceeds to the above-described Step S23. At Step S23, the control section 11 acquires a moving image portion (see "Y" in FIG. 8) that is synchronized with the main moving image from within the designated different angle moving image.

Then, the control section 11 judges whether the transmission timing of the moving image portion in the different angle moving image has been reached (Step S24). Here, "13:10:00" is the transmission start time of the different angle moving image (the image data with the image ID "0100"), and "13:05:00" is the transmission end time of the different angle moving image (the image data with the image ID "0002") that has been transmitted. Therefore, at this transmission end time, the transmission start time of the designated different angle moving image has not been reached (NO at Step S24), and therefore the control section 11 proceeds to the above-described Step S27.

Then, when the transmission start timing of the designated different angle moving image has been reached (YES at Step S24), the control section 11 starts to transmit the data of the different angle moving image (Step S25). That is, the control section 11 starts an operation for streaming the different angle moving image (the image data with the image ID "0100") to the terminal device (terminal B) 3, as shown in FIG. 8. Then, after turning on the above-described synchronous transmission flag (Step S26), the control section 11 proceeds to the above-described Step S27 and, hereafter, repeats the above-described operation. When the data of the main moving image has ended, or when an instruction to end the playback of the data has been received (YES at Step S27), the control section 11 returns to the first Step S1 in FIG. 5, and enters a login standby state.

As described above, in the present embodiment, when predetermined identification information is received from a first terminal device 3, the management server apparatus (image transmission apparatus) 1 transmits first image data to the first terminal device 3. Then, when predetermined identification information is received from a second terminal device 3 different from the first terminal device 3, the management server apparatus (image transmission apparatus) 1 transmits second image data related to the first image data to the second terminal device 3 if the received predetermined identification information is the same as the identification information received from the first terminal device 3. As a result of this configuration, when plural pieces of image data are to be replayed using a plurality of terminal devices 3 on the user side, the transmission of the image data to the plurality of terminal devices 3 can be appropriately controlled, so that the user's desired playback can be performed. That is, a terminal device 3 to be selected and the type of moving image data to be replayed by the selected terminal device 3 can be appropriately changed according to a combination of the terminal devices 3. For example, the first image data (main moving image) can be replayed on a large screen of the first terminal device (notebook PC) 3, and the second image data (different angle moving image) can be replayed by the second terminal device (smartphone) 3.

Also, when requested from a terminal device 3 to transmit designated image data (first image data) and if the request source is valid based on predetermined identification information received from the terminal device 3, the management server apparatus (image transmission apparatus) 1 transmits the designated image data to the first terminal device 3 corresponding to its request source. When predetermined identification information received from a second terminal device 3 is the same as the identification information received from the first terminal device 3, the management server apparatus (image transmission apparatus) 1 judges that the second terminal device 3 is different from the first terminal device 3 but is a terminal device of the same request source, and transmits other image data (second image data) related to the designated image data (first image data). As a result of this configuration, an image optionally designated by the user and an image related thereto can be replayed.

Moreover, the above-described predetermined identification information is not limited to user identification information for identifying a user himself/herself, and may be one of user group identification information for identifying a plurality of users as a group and terminal group identification information for identifying a plurality of terminal devices as a group. In the case where the predetermined identification information is user group identification information or terminal group identification information, the second image data related to the first image data can be replayed by the second terminal device 3 on condition that the request sources of the first image data and the second image data belong to the same group.

Furthermore, when user identification information for identifying an individual is received from a second terminal device (terminal B) 3 different from a first terminal device (terminal A) 3 and is different from user identification information from the first terminal device (terminal A) 3, if it is user identification information corresponding to an individual belonging to a group previously permitted, the control section 11 in the management server apparatus (image transmission apparatus) 1 may judge that the user identification information from the second terminal device (terminal B) 3 is predetermined identification information belonging to the same group. As a result of this configuration, another user belonging to the same group can replay related image data.

Still further, the first attribute information of the above-described second image data (different angle moving image) is the same as that of the first image data, and the second attribute information thereof is different from that of the first image data. As a result of this configuration, related image data can be easily specified only by first and second attribute information being associated with each image data.

Yet still further, the first attribute information and the second attribute information described above are respectively a first image capturing condition and a second image capturing condition representing conditions when image data is captured. As a result of this configuration, related image data can be specified depending on conditions during image capturing.

Yet still further, the above-described first attribute information is at least information regarding an image capturing date and time and information regarding an image capturing location. As a result of this configuration, images captured at the same location and at the same date and time can be specified as related image data.

Yet still further, the above-described second attribute information is at least information regarding an image capturing direction. As a result of this configuration, an image captured at a different angle can be specified as related image data.

Also, the control section 11 starts an operation for separately transmitting a plurality image data to a plurality of terminal devices 3 when identification information received from a first terminal device 3 and a second terminal device 3 are the same. That is, the control section 11 starts an operation for separately transmitting a plurality of image data to a plurality of terminal devices 3 after receiving identification information from the plurality of terminal devices 3. As a result of this configuration, operations for transmitting image data to a plurality of terminal devices 3 can be simultaneously started.

Moreover, when second image data (different angle moving image) that is being transmitted ends, the control section 11 transmits other second image data (different angle moving image) to the terminal device (terminal B) 3. As a result of this configuration, on a terminal device (terminal B) 3 side, plural pieces of image data related to one another are switched and replayed.

Furthermore, when instructed from a terminal device 3 to switch related image data (different angle moving image), the control section 11 switches the current image data to the next related image data. As a result of this configuration, various images can be freely replayed at any time in response to a user's request.

Still further, the control section 11 receives image data from a terminal device 3 and stores it in the image file group IF. In addition, the control section 11 stores the attribute information of the received image data in the image database IB by associating it with the image data. In this state, the control section 11 reads out and transmits requested first image data from the image file group IF, and reads out and transmits second image data from the image file group IF by referring to the image database IB. As a result of this configuration, image data collected from a terminal device 3 can be transmitted in response to a request from the terminal device 3.

Yet still further, the control section 11 transmits, in synchronization with moving image data (first image data) transmitted to a first terminal device (terminal A) 3, moving image data (second image data) related thereto to a second terminal device (terminal B) 3. As a result of this configuration, pieces of moving image data can be synchronously replayed by a plurality of terminal devices 3. For example, multilateral moving image playback can be performed.

Yet still further, the control section 11 streams, in synchronization with moving image data (first image data) streamed to a first terminal device (terminal A) 3, moving image data (second image data) related thereto to a second terminal device (terminal B) 3. As a result of this configuration, even when moving image data is streamed to a first terminal device (terminal A) 3, moving image playback synchronized with this image streaming can be performed on a second terminal device (terminal B) 3 side.

Yet still further, when an instruction signal for controlling a playback operation is received from one of a plurality of terminal devices 3 during the streaming of moving image data, the control section 11 controls the transmission timings of the moving image data simultaneously such that the playback states of the plurality of terminal devices 3 are the same. As a result of this configuration, even when a playback control instruction for instructing one of a plurality of terminal devices 3 to perform fast-forward, rewind, or temporary stop is received during a playback operation, the moving image playback can be synchronously maintained on each terminal devices 3 side.

In the above-described embodiment, an operation for transmitting moving image data to a plurality of terminal devices (terminal A and terminal B) 3 is started after the login of the plurality of terminal devices 3. However, it is also possible that, after the transmission of a main moving image to a first logged-in terminal device (terminal A) 3 is started, if the other terminal device (terminal B) 3 logs in during the transmission, a different angle moving image related to the main moving image is transmitted to the other terminal device (terminal B) 3 in synchronization with the main moving image.

Figure 9:
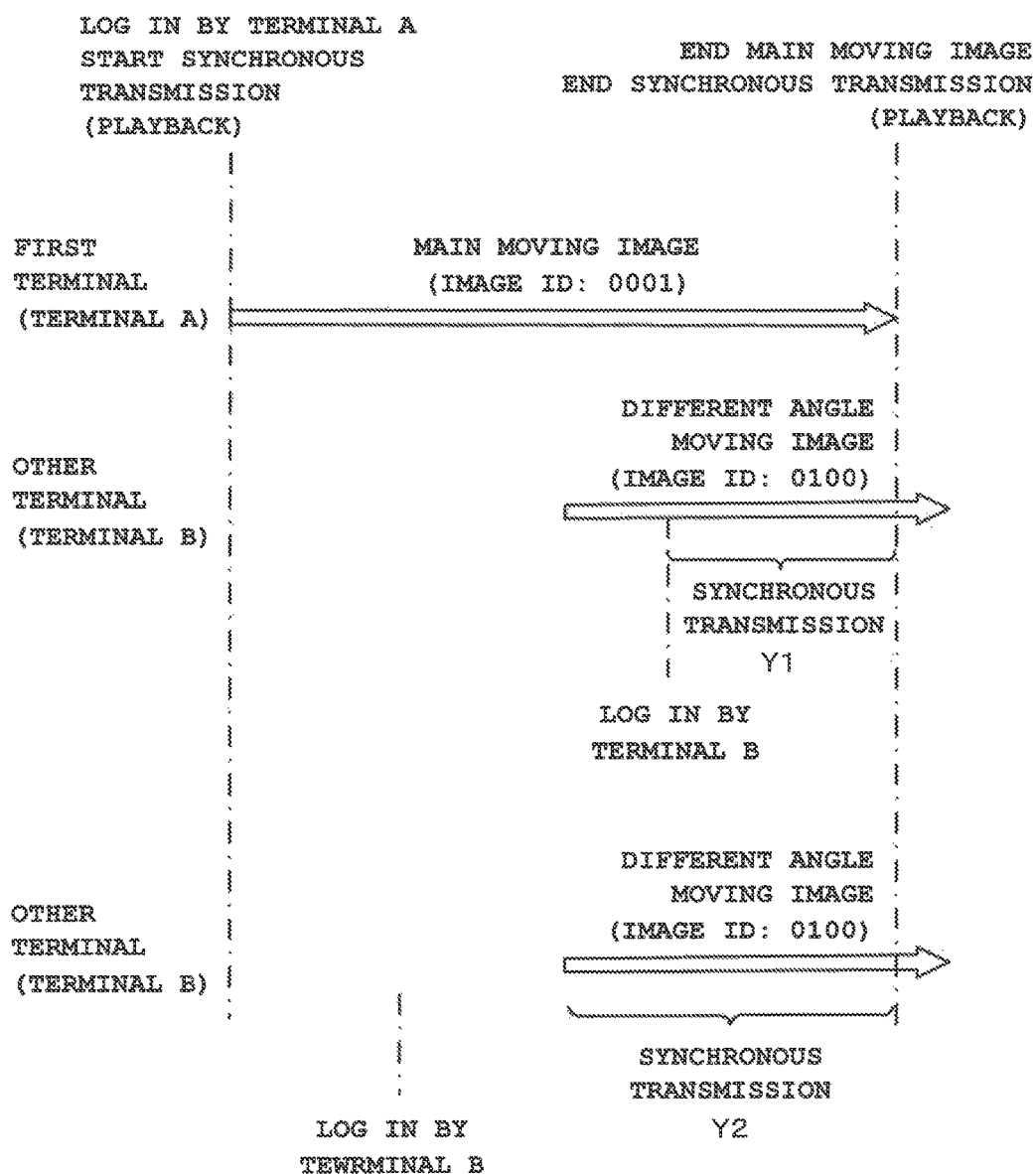
FIG. 9 is a timing chart for describing a modification example of the present embodiment.

FIG. 9 is a timing chart for describing the case where another terminal device 3 logs in during the transmission of a main moving image and a different angle moving image related to the main moving image is transmitted in synchronization with the main moving image.

In FIG. 9, when a main moving image with an "image ID" of "0001" is being transmitted to a terminal device (first terminal device: terminal A) 3, if another terminal device (second terminal device: terminal B) 3 logs in, image data (first image data) with an "image ID" of "0100" is searched for as a main moving image while being searched for as a different angle moving image (second image data) related thereto. Then, a moving image portion after the login of the second terminal device (terminal B) 3 is acquired as a moving image portion that is synchronized with the main moving image, from within the different angle moving image. Note that this moving image portion, which is synchronized with the main image, is a portion "Y1" in FIG. 9 if the login timing is later than the start of the image capturing of the different angle moving image, but is a portion "Y2" in FIG. 9 if the login timing is earlier than the start of the image capturing of the different angle moving image.

By this configuration where the login of a second terminal device (terminal B) 3 can be accepted even when a main moving image is being transmitted to a first terminal device (terminal A) 3, the user can confirm the playback status of a main image and, if necessary, give an instruction to synchronously transmit a different angle moving image.

In the above-described embodiment, users who simultaneously log in and receive moving image data are only users (one user or a plurality of users in a group) having the same identification information. However, in the case of an image sharing service that is simultaneously used by a plurality of different users, the processing shown in the flowcharts in FIG. 5 to FIG. 7 may be performed in parallel for each user (for each identification information). In this case, if a user who has newly logged in has identification information different from that of a user who has already logged in, the processing shown in the flowcharts in FIG. 5 to FIG. 7 may be separately started and performed for the new user.

When a moving image related to a main moving image is to be searched for in such an image sharing service, it may be widely searched for from not only moving images associated with the same user ID but also moving images respectively associated with different user IDs.

In the above-described embodiment, in the case where moving image data is received from a terminal device 3 and is recorded and stored, the "image capturing date and time" of the moving image data is also associated therewith and recorded as it is. However, in a case where moving image data is received in real time from a terminal device (digital video camera) 3 and is recorded and stored, time measurement information may be acquired from a built-in clock in the terminal device (digital video camera) 3, and compared with time measurement information of the management server apparatus 1. If there is an error therebetween, the "image capturing date and time" of the moving image data may be corrected based on the error, and the corrected "image capturing date and time" may be recorded in the image database IB.

Also, in the above-described embodiment, the "image capturing date and time" and the "image capturing location" are shown as examples of the "first attribute information", and the "image capturing direction" is shown as an example of the "second attribute information". However, the present invention is not limited thereto. For example, any combination of the "image capturing date and time", "the image capturing position", and the "image capturing direction" may be set as the "first attribute information" or the "second attribute information". In addition, the "first attribute information" or the "second attribute information" may be not only the "image capturing date and time", "the image capturing location", and the "image capturing direction" but also information regarding a photographic subject (such as the type of an object (person) or the number of objects (persons)). Note that the type of an object herein includes a person, a pet, and a building.

FIG. 10 shows contents of the image database IB when "type of photographic subject (person)" and "image capturing location" are set as "first attribute information" and "image capturing date and time" is set as "second attribute information". The "type of photographic subject (person)" includes a person name and a face image indicating a photographed person, which is "oldest daughter" in the shown example. The "image capturing location" indicates a place name, an address, and a facility name acquired by GPS information and map information, which is "○○ park square" in the shown example. When moving image data acquired by photographing an oldest daughter in a ○○ park square is selected as a main moving image by using the image database IB, moving image data acquired by photographing the oldest daughter in the ○○ park square at a different date and time is set as a moving image related to the main moving image. Therefore, the user can see how the oldest daughter is growing up by comparing new and old moving images captured at the same place. As such, various applications are possible depending on the type of information to be set as the "first attribute information" or the "second attribute information".

Also, in the above-described embodiment, the present invention has been applied in a management server apparatus as an image transmission apparatus. However, the present invention is not limited thereto. For example, the image transmission apparatus and the terminal device may be a personal computer, a PDA (Personal Digital Assistant), a tablet terminal device, and a mobile phone such as a smartphone, an electronic game, or a music player.

Moreover, in the above-described embodiment, the present invention has been applied in a server client system. However, terminals each having a server function and a client function may be directly connected to each other to communicate with each other according to a peer-to-peer system.

Furthermore, the "apparatus" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image transmission apparatus for controlling transmission of image data to a plurality of terminal devices, the image transmission apparatus comprising:
   a communication section including a communication circuit; and
   a control section including a processor and a memory, wherein the control section:
   (i) transmits first image data to a first terminal device by the communication section in a case in which predetermined identification information is received from the first terminal device via the communication section,
   (ii) judges, in a case in which predetermined identification information is received from a second terminal device different from the first terminal device via the communication section, whether or not the predetermined identification information received from the second terminal device is the same as the predetermined identification information received from the first terminal device,
   (iii) performs a related data transmission processing for transmitting second image data related to the first image data to the second terminal device by the communication section in a case in which a judgment is made that the predetermined identification information received from the second terminal device is the same as the predetermined identification information received from the first terminal device, and
   (iv) transmits image data to the second terminal device via the communication section by performing a different transmission processing from the related data transmission processing in a case in which a judgment is made that the predetermined identification information received from the second terminal device is not the same as the predetermined identification information received from the first terminal device.

2. An image transmission method for an image transmission apparatus for transmitting image data between the image transmission apparatus and a plurality of terminal devices, the method comprising:
(i) transmitting first image data to a first terminal device in a case in which predetermined identification information is received from the first terminal device,
(ii) judging, in a case in which predetermined identification information is received from a second terminal device different from the first terminal device, whether or not the predetermined identification information received from the second terminal device is the same as the predetermined identification information received from the first terminal device,
(iii) performing a related data transmission processing for transmitting second image data related to the first image data to the second terminal device in a case in which a judgment is made that the predetermined identification information received from the second terminal device is the same as the predetermined identification information received from the first terminal device, and
(iv) transmitting image data to the second terminal device by performing a different transmission processing from the related data transmission processing in a case in which a judgment is made that the predetermined identification information received from the second terminal device is not the same as the predetermined identification information received from the first terminal device.

3. The image transmission method according to claim 2, wherein the method further comprises:
(i) authenticating, in a case in which image data is designated and transmission of the image data is requested by a terminal device, whether or not a request source is valid based on predetermined identification information received from the terminal device,
(ii) transmitting the designated image data as the first image data to the first terminal device corresponding to the request source in a case in which the request source is authenticated as valid,
(iii) judging that the second terminal device is different from the first terminal device but is a terminal device of the same request source in a case in which the predetermined identification information received from the second terminal device is the same as the predetermined identification information received from the first terminal device, and
(iv) transmitting, as the second image data, other image data related to the designated image data to the terminal device of the same request source which is different from the first terminal device.

4. The image transmission method according to claim 3, wherein the predetermined identification information is one of user identification information for identifying a user individual, user group identification information for identifying a plurality of users as a group, and terminal group identification information for identifying a plurality of terminal devices as a group.

5. The image transmission method according to claim 2, wherein the method further comprises:

in a case in which user identification information is received from the second terminal device as the predetermined identification information and is previously permitted user identification information, judging that the received user identification information is predetermined identification information that is the same as user identification information from the first terminal device even if the received user identification information differs from the user identification information from the first terminal device.

6. The image transmission method according to claim 2, wherein the image data has been associated with first attribute information and second attribute information regarding an attribute of the image data, and
wherein the related image data has the same first attribute information and a different second attribute information.

7. The image transmission method according to claim 6, wherein the first attribute information and the second attribute information are respectively a first image capturing condition and a second image capturing condition representing conditions when the image data is captured.

8. The image transmission method according to claim 7, wherein the first attribute information is at least one of information regarding an image capturing date and time, information regarding an image capturing location, information regarding an image capturing direction, and information regarding a type of a photographic subject serving as an image capturing target.

9. The image transmission method according to claim 7, wherein the second attribute information is at least one of information regarding an image capturing direction, information regarding an image capturing date and time, information regarding an image capturing location, and information regarding a type of a photographic subject serving as an image capturing target.

10. The image transmission method according to claim 2, wherein an operation for transmitting the image data is started when a judgment is made that the predetermined identification information received from the second terminal device is the same as the predetermined identification information received from the first terminal device.

11. The image transmission method according to claim 2, wherein the method comprises, in a case in which the predetermined identification information is received from the second terminal device after start of transmission of the first image data, starting an operation for transmitting the second image data to the second terminal device on condition that the predetermined identification information from the second terminal device has been judged to be the same as the predetermined identification information from the first terminal device.

12. The image transmission method according to claim 2, wherein the method comprises:
in a case in which the second image data is ended, transmitting second image data other than the ended second image data to the second terminal device.

13. The image transmission method according to claim 2, wherein the method comprises, when an instruction to switch the second image data is given from the second terminal device while the second image data is being transmitted, switching the second image data that is being transmitted to image data different from the second image data.

14. The image transmission method according to claim 2, wherein the method comprises (i) receiving image data from a terminal device, (ii) recording the received image data in a recording section in association with attribute information of the received image data and user identification information, and (iii) reading out the first image data and the second image data from the recording section so as to transmit the first image data and second image data to the second terminal device.

15. The image transmission method according to claim 2, wherein the image data is moving image data, and
wherein the method comprises, when transmitting related moving image data as the second image data to the second terminal device, transmitting the second image data in synchronization with moving image data transmitted as the first image data.

16. The image transmission method according to claim 15, wherein the first attribute information is information regarding an image capturing time, and
wherein the method comprises, when the image transmission apparatus is streaming the moving image data, synchronizing the streaming with moving image data streaming by a communication section, based on the image capturing time.

17. The image transmission method according to claim 16, wherein the method comprises:
receiving an instruction signal for controlling a playback operation from one of the plurality of terminal devices, and
simultaneously controlling transmission timings of the moving image data such that respective playback statuses of the plurality of terminal devices are the same, when the instruction signal is received during the streaming of the moving image data.

18. A non-transitory computer-readable storage medium having stored thereon a program that is executable by a computer in an image transmission apparatus for controlling transmission of image data to a plurality of terminal devices, the program being executable by the computer to actualize functions comprising:
processing for transmitting first image data to a first terminal device in a case in which predetermined identification information is received from the first terminal device;
processing for judging, in a case in which predetermined identification information is received from a second terminal device different from the first terminal device, whether or not the received predetermined identification information is the same as the predetermined identification information received from the first terminal device,
processing for performing a related data transmission processing for transmitting second image data related to the first image data to the second terminal device in a case in which a judgment is made that the received predetermined identification information is the same as the predetermined identification information received from the first terminal device, and
processing for performing a different transmission processing from the related data transmission processing for transmitting image data to the second terminal device in a case in which a judgment is made that the predetermined identification information received from the second terminal device is not the same as the predetermined identification information received from the first terminal device.

* * * * *